United States Patent [19]

Nakasa et al.

[11] Patent Number: 4,961,083
[45] Date of Patent: Oct. 2, 1990

[54] ELECTRONIC FLASH DEVICE FOR A CAMERA AND ACCESSORY SHOE FOR MOUNTING AN ELECTRONIC FLASH DEVICE ON A CAMERA

[75] Inventors: Masayuki Nakasa; Norio Ishikawa; Hiroshi Hosomizu, all of Osaka, Japan

[73] Assignee: Minolta Camera Kabushiki Kaisha, Osaka, Japan

[21] Appl. No.: 350,401

[22] Filed: May 11, 1989

[30] Foreign Application Priority Data

May 16, 1988 [JP] Japan .................. 63-118623

[51] Int. Cl.⁵ .............................. G03B 17/00
[52] U.S. Cl. .............................. 354/145.1
[58] Field of Search .............. 354/145.1, 418

[56] References Cited

U.S. PATENT DOCUMENTS

| | | | |
|---|---|---|---|
| 3,712,197 | 1/1973 | Wagner | 354/145.1 X |
| 4,354,751 | 10/1982 | Izumi et al. | 354/145.1 |
| 4,406,533 | 9/1983 | Yamamoto | 354/145.1 |
| 4,448,509 | 5/1984 | Katsuma et al. | 354/286 |
| 4,639,112 | 1/1987 | Nakai et al. | 354/286 X |

FOREIGN PATENT DOCUMENTS 52-48402  4/1977  Japan .
58-72132  4/1983  Japan .
61-69052  4/1986  Japan .

*Primary Examiner*—Brian W. Brown
*Attorney, Agent, or Firm*—Burns, Doane, Swecker & Mathis

[57] ABSTRACT

An accessory shoe for mounting an electronic flash device on a camera, which is provided at a top portion of the camera and has a plurality of terminals for circuitry of the camera arrayed in a direction in which the electronic flash device is inserted into the accessory shoe. Of the plurality of terminals, a terminal which leads to an X contact and outputs a signal indicative of a situation of the X contact is located at a position closest to an insertion opening of the accessory shoe and is connected to a terminal on an electronic flash device for inputting the signal at the end of a mounting procedure of the electronic flash device.

20 Claims, 4 Drawing Sheets (TYPE 1)

(TYPE 2)

ELECTRONIC FLASH DEVICE FOR A CAMERA AND ACCESSORY SHOE FOR MOUNTING AN ELECTRONIC FLASH DEVICE ON A CAMERA

BACKGROUND OF THE INVENTION

1. Field of the Invention

The present invention relates to a camera accessory shoe and to an electronic flash device which can be detachably mounted to the camera accessory shoe.

2. Description of the Prior Art

Conventional cameras, such as the single lens reflex camera (SLR), are typically provided on the top with an accessory shoe of a type such as shown in FIG. 16 such that electronic flash devices can be mounted by sliding the mounting member of said device into the shoe. In such an application, improper contact connections when mounting the electronic flash device on the camera have been prevented by forming the contacts on the electronic flash device as a peak-like shape and adequately arranging the positions of the contacts. In such cases, however, when the number of contacts is to be increased, a broad area for the contact array is necessary in the direction perpendicular to the insertion direction of the electronic flash device if improper connections during mounting are to be avoided, and this makes design extremely difficult.

At the same time, many cameras of the type which mount an electronic flash device without using an accessory shoe such as shown in FIG. 16 are also known. On cameras of this type, a contact block for the electronic flash device is concentrated in a small space, and the electronic flash device is mounted by pushing contacts of the flash device onto a flash mount surface of the camera and engaging or screwing the flash device in place. Specifically, because the flash device is not mounted by sliding the flash device across the mounting surface, improper contact connections during mounting do not occur. However, the construction at a flash mounting portion is complex, and mounting tends to be cumbersome.

As cameras have become more functionally advanced, it has become desirable to alter the configuration of the slide mount accessory shoe for a number of reasons, including the need for an increased number of contacts in the electronic flash to camera connection, for the shape of the accessory shoe to be elongated in the direction of an optical axis when used for electronic flash devices provided with an auxiliary light source for automatic focusing so that the optical axes of the camera and flash device are precisely aligned, and for the ability to effectively utilize the cramped space on the camera.

Arraying the contacts in a series in the direction of flash device insertion has been one possible way to change the shape of the accessory shoe and to satisfy the conditions of the above requirements, but in this case problems such as do not occur with the conventional accessory shoe as illustrated in FIG. 16 may occur, specifically, improper contact connections may transitionally occur during flash mounting.

If the camera circuitry and the flash circuitry are improperly connected, the camera circuitry and/or the flash circuitry may function improperly and in extreme cases the circuitry of either device may be impaired. Furthermore, it may also happen that the circuitry misoperates during flash mounting or removal, causing the flash to go off and thus surprising the photographer.

SUMMARY OF THE INVENTION

Therefore, the object of the present invention is to provide an accessory shoe for mounting an electronic flash device on a camera and an electronic flash device to be inserted in the accessory shoe each of which is provided with a contact array of the type such that problems such as described above do not occur in spite of possible improper connections transitionally made during flash mounting and dismounting.

In order to accomplish the above object, an accessory shoe for mounting an electronic flash device on a camera according to the present invention is provided at a top portion of the camera and has a plurality of terminals for circuitry of the camera arrayed in a direction in which the electronic flash device is inserted into the accessory shoe, wherein a terminal leading to an X contact of the camera for outputting a signal indicative of a situation of the X contact is positioned closer to an insertion opening of the accessory shoe than any other terminal and is connected to an input terminal on the flash device for inputting the signal at the end of a mounting procedure of the flash device.

It is desirable to locate a terminal which outputs a voltage from the camera at a position farthest from the insertion opening of the accessory shoe.

On the other hand, an electronic flash device to be detachably mounted on a camera of the present invention has a plurality of terminals for circuitry thereof which are arrayed at a bottom thereof in a direction in which the electronic flash device is inserted into an accessory shoe of the camera, wherein an input terminal for receiving a signal indicative of a closing of an X contact from the camera is positioned farther from a front side of the electronic flash device than any other terminal and is connected to an output terminal of the camera leading to the X contact for outputting the signal indicative of a situation of the X contact at the end of a mounting procedure of the flash device during which the input terminal of the electronic flash device is not connected to any terminal on the accessory shoe other than the output terminal leading to the X contact.

It is desirable to locate a terminal which receives a voltage from the camera at a position closest to the front side of the electronic flash device.

According to the present invention, while an electronic flash device of the above construction is being mounted on a camera provided with an accessory shoe of the above construction, transitional improper connections between some terminals on the accessory shoe and some of the terminals on the electronic flash device occur. But, an improper connection of the X-contact signal (synchronizing signal) input terminal of the flash device to the terminals on the camera other than the X-contact signal (synchronizing signal) output terminal leading to the X contact does not occur during the mounting procedure of the electronic flash device to the camera, owing to the position of the X-contact signal input terminal of the flash device.

When the flash device is dismounted from the camera, the X-contact signal input terminal of the flash device is disconnected from the output terminal leading to the X contact of the camera at the start of the dismounting operation and thereafter does not improperly connect with any other contact on the camera.

Therefore, it is possible to prevent such problems as the flash device accidentally emission due to the flash mounting or dismounting operation and thus surprising the photographer.

Furthermore, because at the same time the terminal which outputs a voltage from the camera is located at a positioned farthest from the insertion opening of the accessory shoe, the terminal which outputs a voltage from the camera is connected properly with the voltage input terminal of the flash device at the end of the mounting operation without improperly connecting with the voltage input contact of the flash device while mounting the flash to the camera, and, moreover, when the flash device is dismounted from the camera, the terminal which outputs a voltage from the camera is disconnected from the voltage input terminal of the flash device at the start of the dismounting operation and thereafter does not improperly connect with any other contact on the flash device. Therefore, it is possible to prevent such problems as the circuitry misoperating or a reverse voltage being applied to the circuitry of the flash device or camera due to the flash mounting or dismounting operation and thus damaging the circuitry.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF PREFERRED EMBODIMENTS

Figure 1:
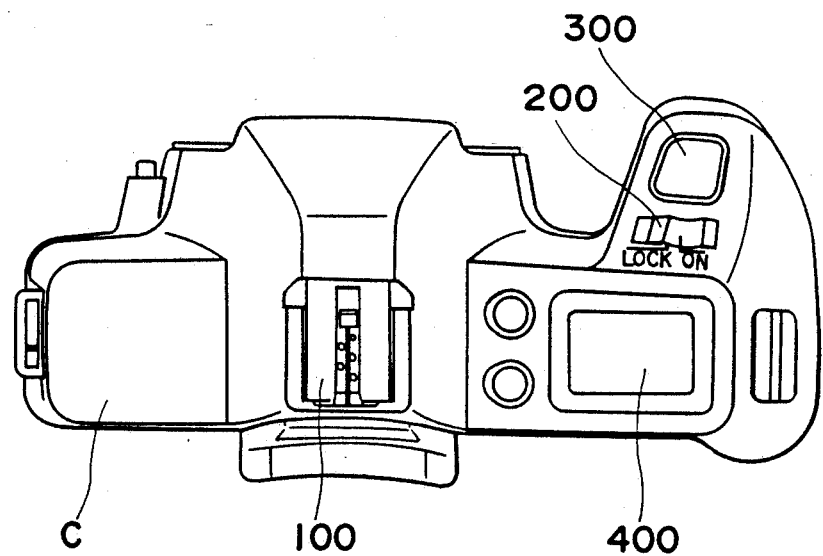
FIG. 1 is a top view of a camera according to a preferred embodiment of the present invention.

FIG. 1 is a top view of a camera according to a preferred embodiment of the present invention. As can be seen in FIG. 1, an accessory shoe 100 for mounting a flash device is provided on the top of a camera body C, and the present invention is adopted to the accessory shoe 100. On the top of this camera are also provided a main switch 200, a shutter release button 300, a liquid crystal display (LCD) 400, and other members, but these are not directly related to the present invention and description of these is not provided herein.

Figure 2:
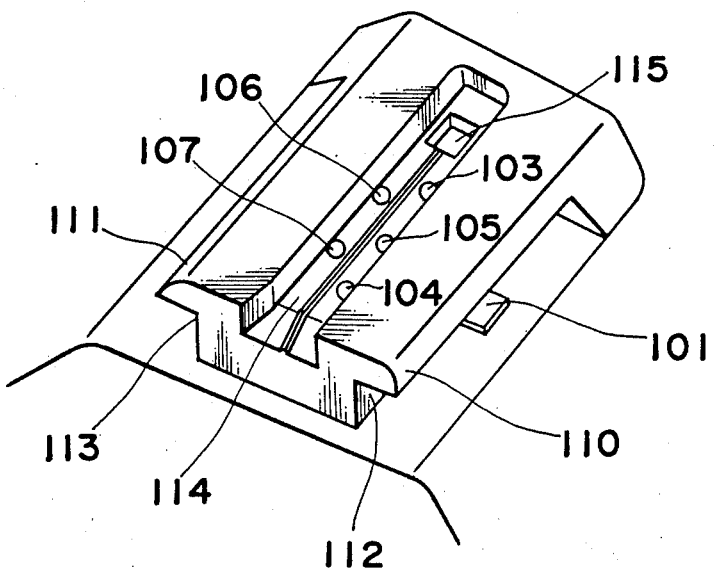
FIG. 2 is an enlarged perspective view of an accessory shoe member shown in FIG. 1.

FIG. 2 is an enlarged perspective view of the accessory shoe 100. The accessory shoe 100 is configured in such a manner that a mounting position of a flash device is controlled by guide rails 110, 111, which extend to the relative opposite sides similarly to roof eaves, rail channels 112, 113, and a center channel 114. Specifically, the flash device mounted in this accessory shoe is provided with a mounting member configured to fit precisely into the guide rails 110, 111 and the channels 112, 113, 114, and is mounted by sliding the mounting member into the accessory shoe from a insertion opening. The inside of the center channel 114 is provided with a recess 115 which functions to fit with a click lock member 715 provided on the flash device and shown in FIG. 3 in such a manner as to assure a firm contact. A group of electrical contacts 103, 105, 104, 106, 107 which are terminals for a camera circuitry is provided in two series and alternating in a staggered pattern on the center channel 114.

The rail channels 112, 113 are provided in the center with electrical contacts or terminals 101, 102 for large current (the contact 102 is located symmetrically to the contact 101 but cannot be seen because FIG. 2 is a perspective view of the accessory shoe). These contacts will be described in detail later.

It is to be noted that the camera according to the present embodiment is accommodated to flash devices of two different types. Specifically, the first type of flash device is one which is not provided with an independent power source and receives its power supply from the camera, and the second type of flash device is on which is provided with an independent power source, does not receive its power supply from the camera, and functions by receiving only control signals from the camera.

Figure 3:
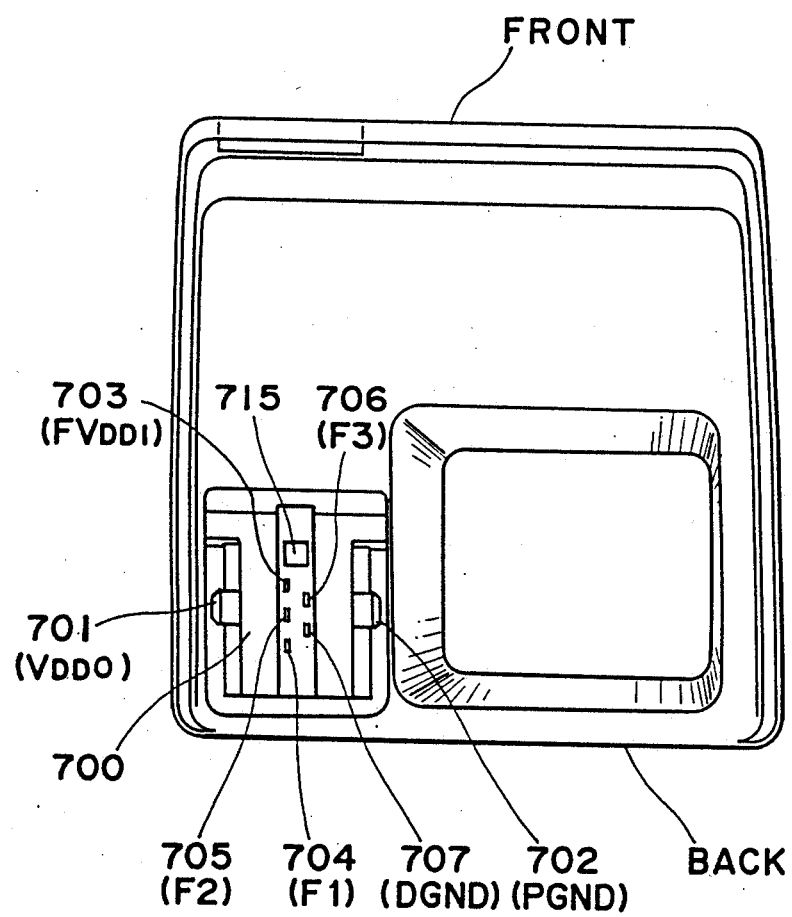
FIG. 3 and FIG. 4 are bottom views of different types of flash devices of the present invention mounted on the camera.

FIG. 3 is a view showing the bottom of the first type of flash device as described above. A mounting member 700 has a shape in which concave portions and convex portions are reversed as that of the accessory shoe 100 of the camera such that it fits precisely with the accessory shoe 100. On both sides of the mounting member are provided large current contacts 701, 702, and in the center is provided a group of electrical contacts 703, 705, 704, 706, 707, which are terminals for a flash device circuitry, in two series and alternating in a staggered pattern such that these connect, respectively, with electrical contacts 103, 105, 104, 106, 107 on the camera.

Figure 4:
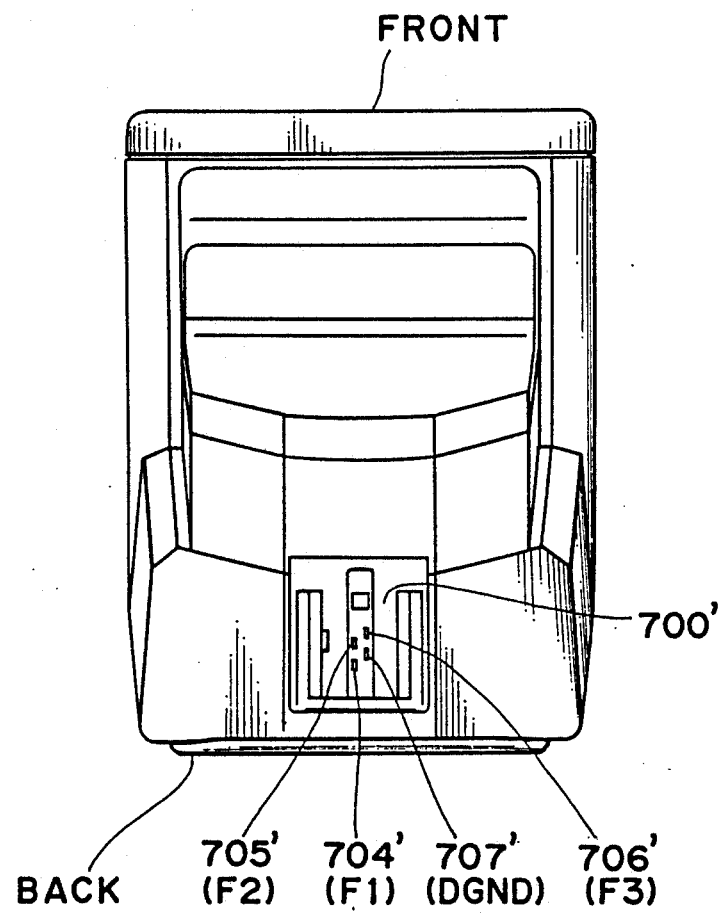

FIG. 4 is a view showing the bottom of the second type of flash device as described above. The shape of a mounting member 700' is exactly identical to that of the first type of flash device, but electrical contacts differ. The reason for this will be described later, but it should be noted that contacts corresponding to the large current contacts 701, 702 and the contact 703 are not provided in this construction.

Figure 5:
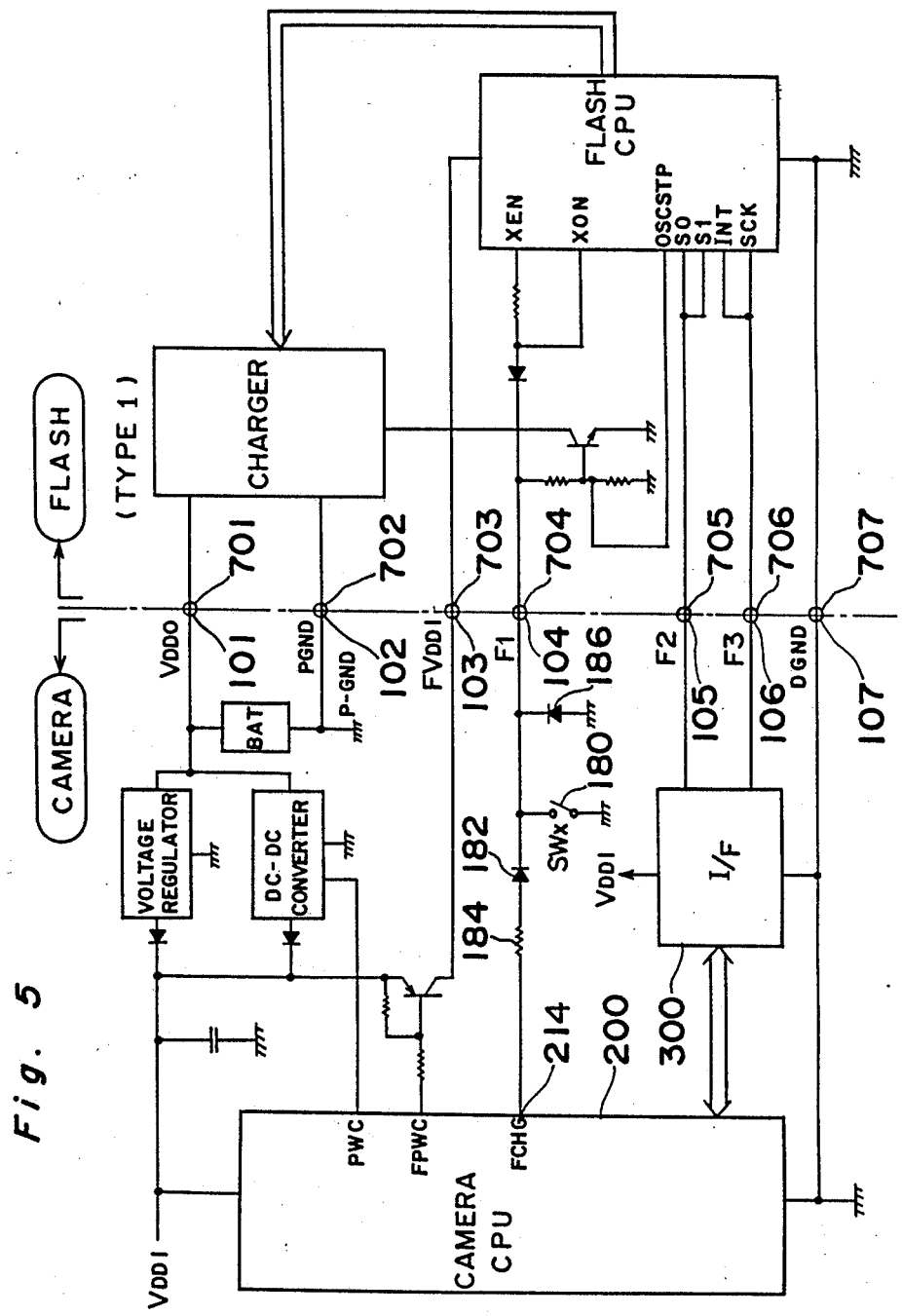
FIG. 5 and FIG. 6 are circuit diagrams showing the circuit connections between the camera and flash devices of FIG. 3 and FIG. 4, respectively.

FIG. 5 is a circuit connection diagram in which the first type of flash device is properly connected to the camera.

In FIG. 5, VDD0 (101, 701) and PGND (102, 702) are terminals for supplying large current from the camera to the flash device and ground terminals for the large current. Because it is important that the contact resistance be as low as possible, the contact configuration differs from that of the normal signal transmission contact groups 103–107 (703–707). Specifically, as shown in FIG. 2 and FIG. 3, the large current and the ground contacts 101 (701) and 102 (702) have large contact areas when compared with the contacts 103–107 (703–707) and provided inside the rail channels 112, 113. FVDD1 (103, 703) is a contact which supplies an electric power for a logic circuit of the flash device from the camera to the flash device.

X-contact terminals F1 (104, 704) are for outputting and inputting a signal for triggering a flash light emission from the camera to the flash device; if these terminals become LOW when a main capacitor in the flash is in a fully charged state, the flash emits a flash light. Specifically, when the shutter is released and a first curtain of a focal plane shutter has traveled completely, continuity exists to the X contact (SWX 180 in FIGS. 5 and 6), the synchronization signal is sent from the camera to the flash device via F1 (104, 704), and the flash device emits light synchronously.

It is to be noted that when a flash of the first type is mounted, a signal which controls a boosting charging of a main capacitor in the flash device is also sent from the camera to the flash device via this contact when not in the shutter release sequence.

Furthermore, in FIG. 5, 182 and 186 are diodes having a resistance against high voltage, and 184 is a resistor for the protection of a camera CPU 200. Commonly available flash devices are of various types, including devices in which a high voltage charge of several hundred volts is directly applied to the X-contact terminals, and ones in which a reverse voltage of several hundred volts is applied to the X-contact terminals. As a safety measure against the direct application of a high voltage charge, a diode 182 and a resistor 184 are provided to prevent a high voltage from being applied directly to a terminal 214 of the CPU 200 in the camera, and as a safety measure against the application of a reverse voltage, a diode 186 is provided to bypass the current. In the case of a reverse voltage being applied, the potential of F1 (104) becomes negative in an amount equivalent to the forward current of the diode 186, but because the diode 182 is also present, the negative potential is not applied to the terminal 214 of the CPU 200 in the camera.

F2 (105, 705) and F3 (106, 706) are terminals for serial data transmission between the camera and flash, and specifically F2 (105, 705) is for serial data and F3 (106, 706) is for serial clocks.

DGND (107, 707) is a ground terminal for signal transmission.

Figure 6:
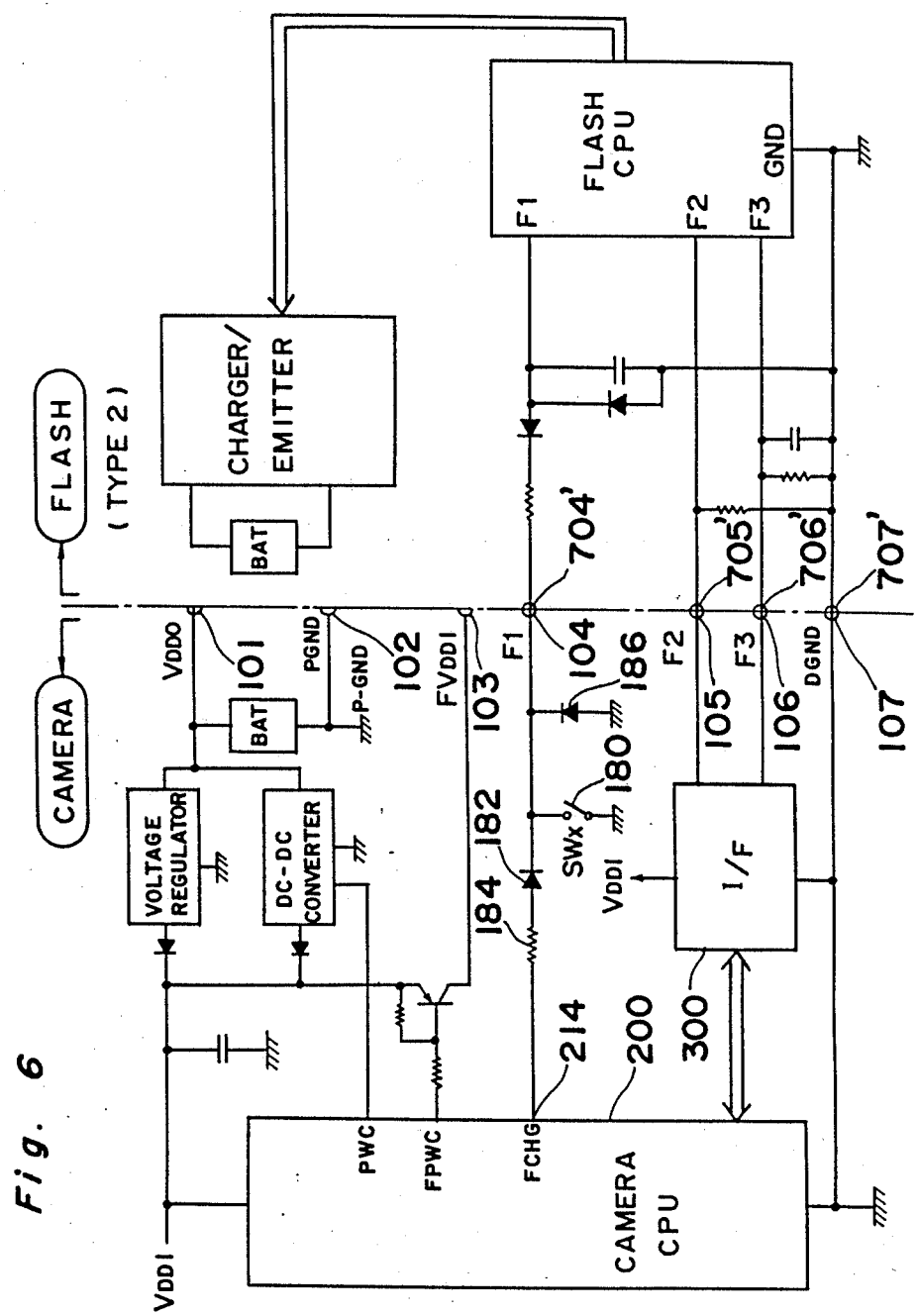

FIG. 6 is a circuit connection diagram in which the second type of flash device is properly connected to the camera.

A flash of the second type is provided with its own power supply, and does not need to receive a power supply from the camera. Therefore, terminals VDD0, PGND, and FVDD1 are not provided, and only terminals or contacts F1 (704'), F2 (705'), F3 (706'), and DGND (707') are provided in the flash.

The functions of F1, F2, and F3 are the same as those for the first type of flash as described above.

As described with reference to FIG. 2 above, the flash device is mounted by facing the front of the flash device toward the lens side (i.e., the front side) of the camera and sliding the mounting member of the flash device into the accessory shoe from the back of the camera. The flash device is dismounted by sliding the flash device to the back and off the accessory shoe in the direction opposite that of mounting the flash. Therefore, if the contacts are aligned parallel to the direction of flash device mounting and dismounting, the contacts on the flash device and on the camera will be temporarily in an improperly connected state during the flash mounting and dismounting process.

If the camera circuitry and the flash circuitry are improperly connected, the camera circuitry and/or the flash circuitry may function improperly and in extreme cases the circuitry of either device may be impaired. Furthermore, it may also happen that the circuitry misoperates during flash mounting or dismounting, causing the flash to emit light and thus surprising the photographer.

Figure 7:
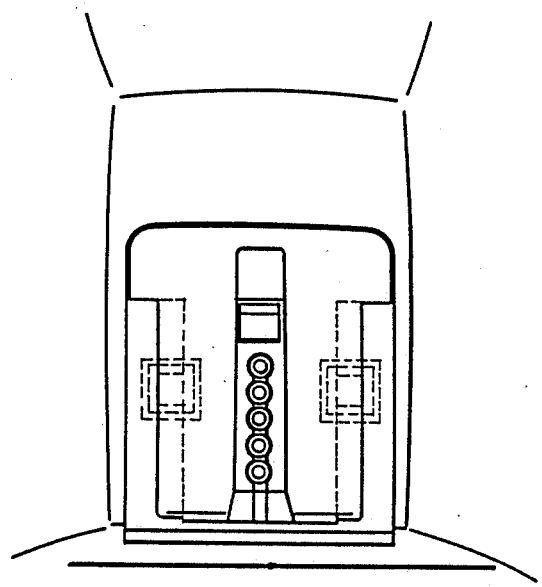
FIG. 7 shows a top view of the contact array according to an alternative embodiment of the present invention.

If the contacts are arrayed in a single series as shown in FIG. 7, improper circuit connections will frequently occur during the flash mounting and dismounting process (in the example shown there are three possible improper connections). This creates extremely complex problems with respect to the construction of the interface circuit between the camera and flash device, therefore makes the circuit construction required to cope with the resultant problems complex, and thus increases costs. If the contact group is arrayed in a row perpendicular to the direction of flash mounting (insertion) (i.e., the lateral direction of the camera), improper circuit connections will not occur during the flash mounting and dismounting process, but it is extremely difficult to obtain on the confined space on the camera a space large enough to array the contacts in a row in the above direction.

From these various reasons, the contacts in the preferred embodiments according to the present invention are, as shown in FIGS. 2, 3, and 4, arrayed in two series in a staggered pattern in a confined space to minimize improper circuit connections occurring during the flash mounting and dismounting process. It is to be noted that the case shown in FIG. 7 does offer disadvantages such as previously described when compared with the case of FIG. 2, but it is clear that the technology of the present invention can be applied to that case shown in FIG. 7, and the case may be considered an alternative embodiment according to the present invention. This embodiment offers the advantage of requiring less space in the lateral direction when compared with that shown in FIG. 2.

The relationship of the circuit connections during the flash mounting and dismounting process for the embodiment as shown in FIG. 2 (or FIG. 3) in which the terminals F1 (104), DGND (107), F2 (105), F3 (106), and FVDD1 (103) are arrayed in a staggered pattern in order from back to front of the camera is described below.

A combination of the camera with a flash of the first type is first considered.

Figure 8:
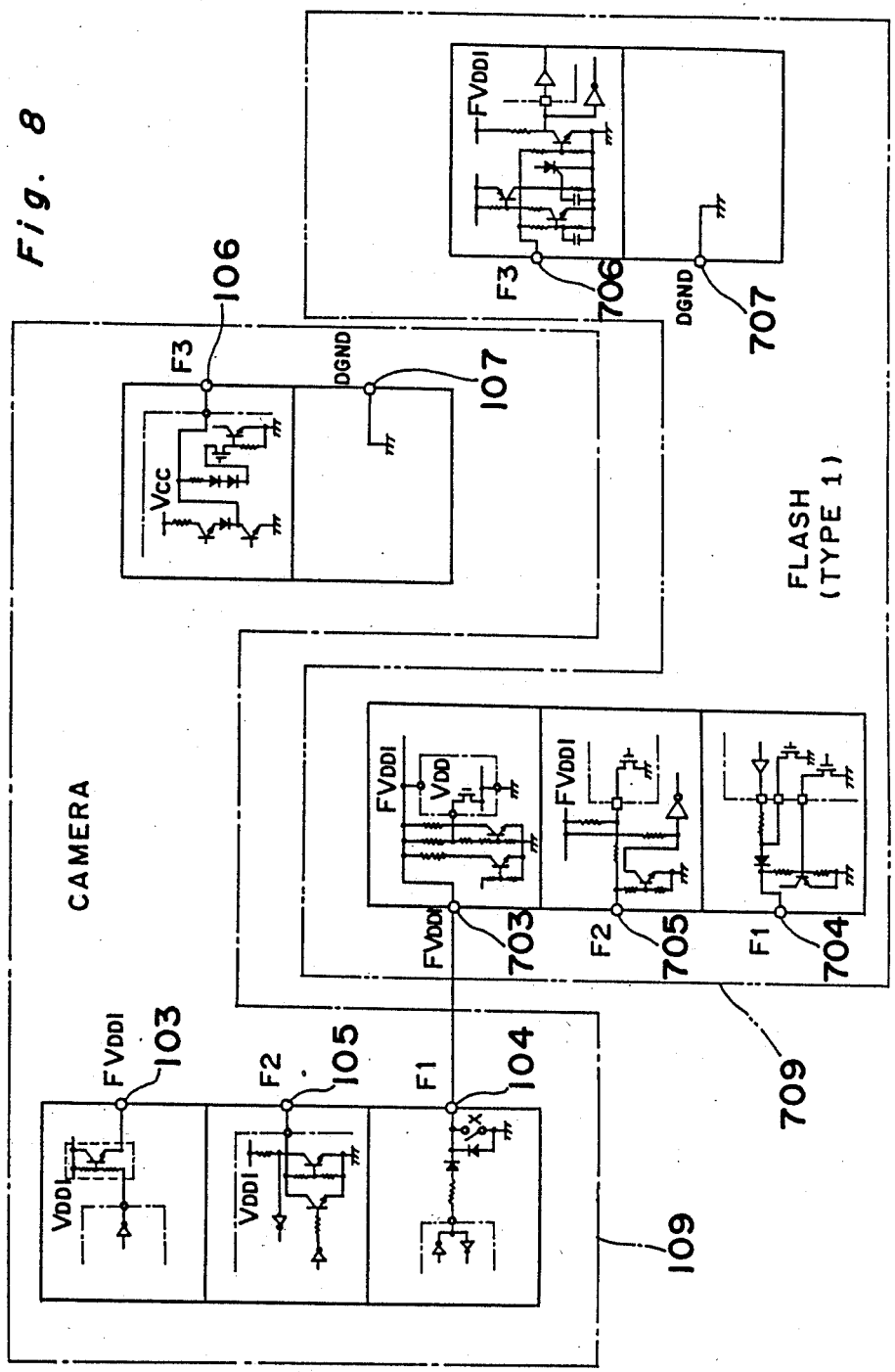
FIGS. 8,, 9, 10, 11, 13, and 15 show the improper circuit connections occurring during mounting of the flash device to the camera.
Figure 9:
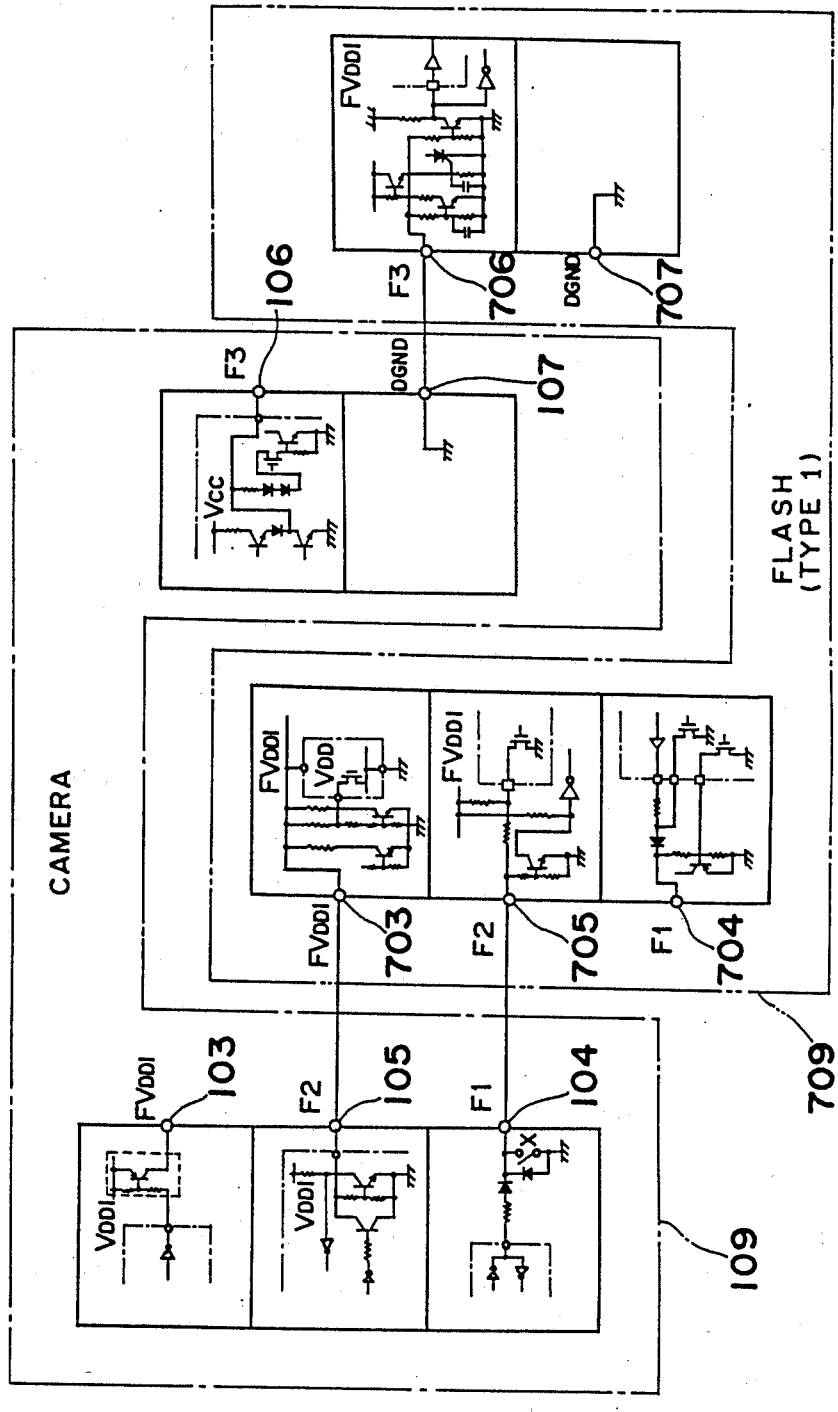

FIG. 8 and FIG. 9 show transitional connections occurring during the mounting process of a flash device of the first type to the camera.

In FIG. 8 and FIG. 9, the area 109 circumscribed by a single dot-dash line represents the camera contacts or terminals and interface circuits connected to the contacts, and the area 709 circumscribed by a double dot-dash line represents the flash device contacts or terminals (of the first type) and interface circuits connected to contacts.

At the first stage of the mounting process as shown in FIG. 8, only terminal F1 (104) on the camera and terminal FVDD1 (703) on the flash connect, and the other contacts are not connected. Therefore, because a closed circuit is not formed in this state, this connection is electrically insignificant, and there is no problem.

Next, as mounting proceeds to the stage as shown in FIG. 9, terminals F2 (105), F1 (104), and DGND (107) on the camera are respectively connected to terminals FVDD1 (703), F2 (705), and F3 (706) on the flash device In this state, a power supply for signalling is not supplied through a normal path in a signal processing circuit of the camera. The terminal F2 (105) on the camera also does not have the ability to supply a current since the circuit connected to the terminal F2 inside the camera is a type of open-collector. The terminal F1 (104) on the camera is a bi-directional CMOS circuit that normally has a LOW output and does not supply a power current. Therefore, in a connection as shown in FIG. 9, because there is no power supplied from the camera to the flash device, there is no concern about improper operation.

The combination with a flash of the second type is described next.

Figure 10:
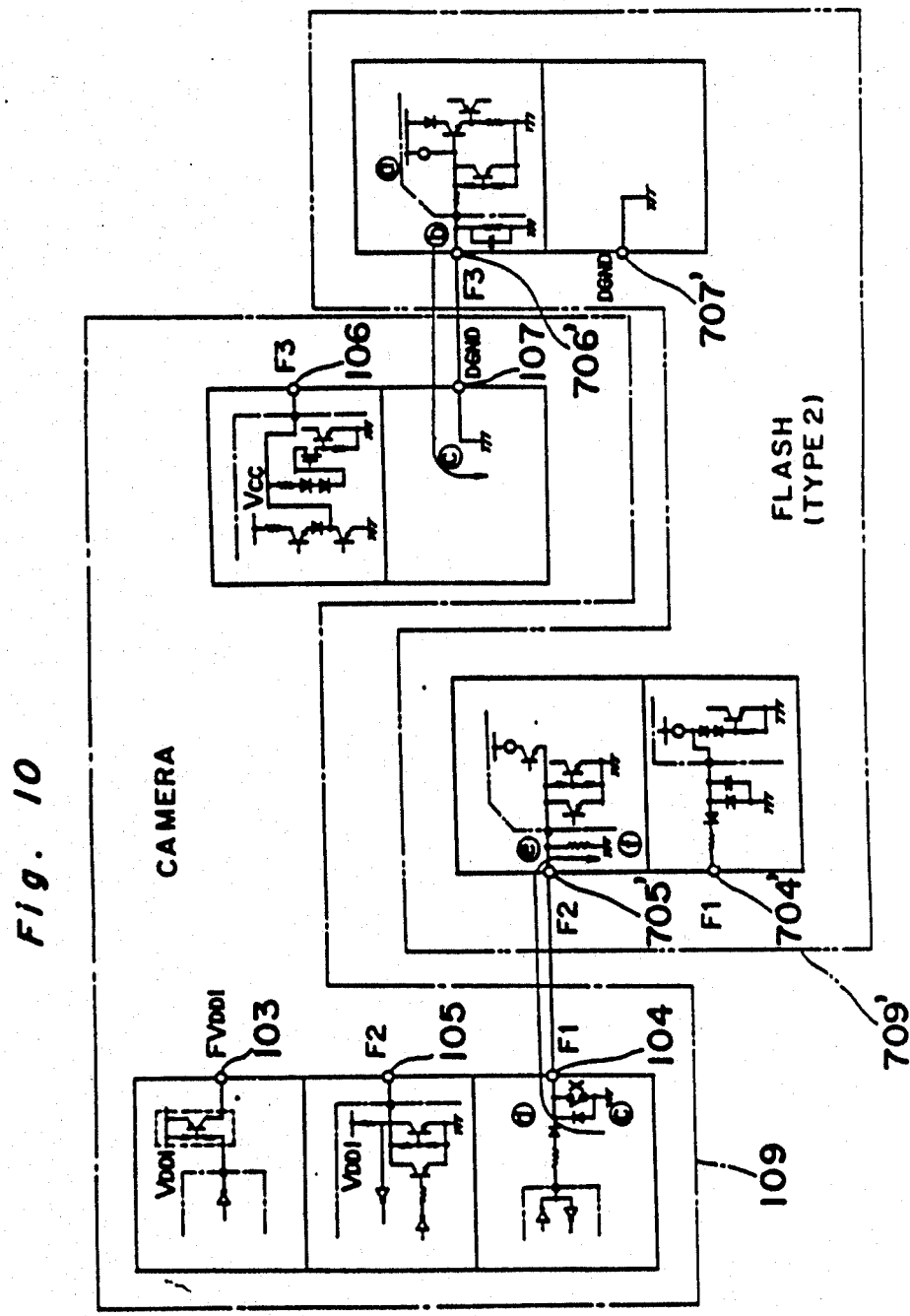

FIG. 10 shows the transitional connections occurring during the mounting process of a flash device of the second type to the camera.

In FIG. 10, the area 109 circumscribed by a single dot-dash line represents the camera contacts and interface circuits connected to said contacts as in FIG. 9, and the area 709' circumscribed by a double dot-dash line represents the flash device contacts (of the second type flash) and interface circuits connected to said contacts.

At the first stage of the mounting process as shown in FIG. 10, the terminal F2 (705') on the flash connects with the terminal F1 (104) on the camera, and F3 (706') on the flash connects with DGND (107) on the camera. (Because there is no terminal FVDD1 on the flash, this stage of the mounting process corresponds to the second stage of the mounting process with the flash device of the first type.)

At this time, because the flash device has its own power supply current flows from (a) to (b) to (c) to (d) to (e) to (f) as shown in FIG. 10, through resistors, transistors, and diodes. This is not a normal current path, but it will not damage the circuit or cause any improper operation.

This is described below in more detail.

Figure 11:
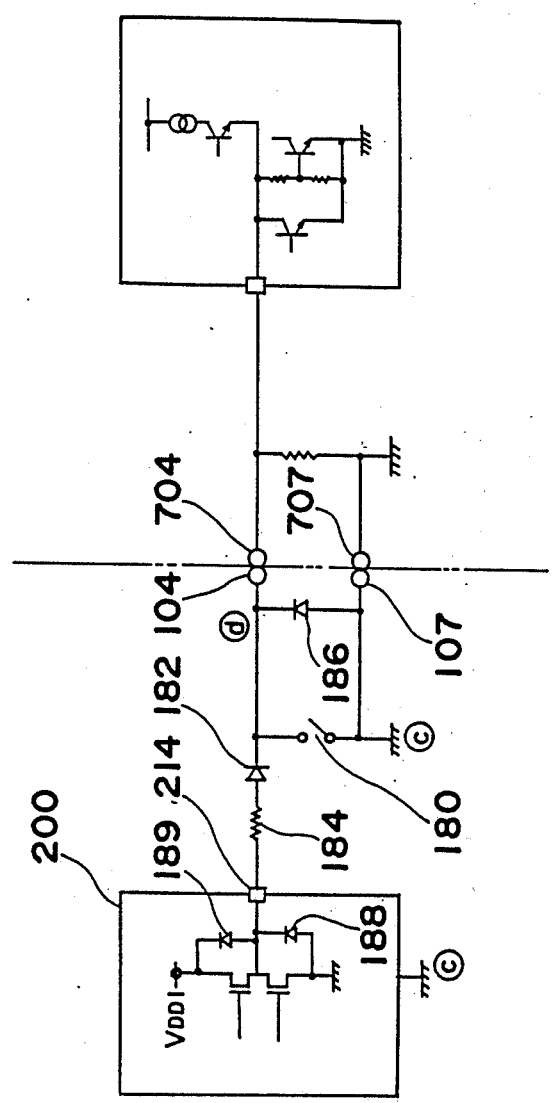

FIG. 11 is a detailed drawing of the circuit corresponding to section (c)-(d) in this current path. The output circuit for the output terminal 214 of the camera CPU 200 is a CMOS construction to which parasitic diodes 188, 189 are provided. Therefore, in the event a reverse bias is applied to the terminal F1 (104), the current paths of (c)-(d) include one passing diode 186 and one passing parasitic diode 188 in the CPU 200; because the latter has a resistor 184 and a diode 182 provided in series, nearly all currents will in practice pass the diode 186, and there is, therefore, virtually no stress applied to the CPU 200.

Figure 16:
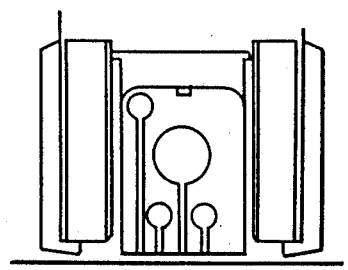
FIG. 16 is one example of a conventional camera accessory shoe.

However, because the diode 186 requires performance with respect to voltage resistance and current capacity as a means of providing protection against high reverse voltage application, greater mounting space is required and costs increase. In the present invention, by changing the configuration of the accessory shoe from the conventional design shown in FIG. 16 to the configuration shown in FIG. 2, conventional flash devices of the type to which a reverse voltage is applied are not directly mounted to this camera, and for this reason, it is not always necessary that the diode 186 be provided within the camera. Therefore, it is possible that the diode 186 be removed from the camera circuitry. It is to be noted that if an adapter which converts the accessory shoe configuration as shown in FIG. 2 to the accessory shoe configuration as shown in FIG. 16 is provided, it will be possible to mount a conventional flash corresponding to the accessory shoe as shown in FIG. 16 to the camera of the embodiment, and in this case the diode 186 may be provided within the adapter.

In the event the diode 186 is removed from the camera circuitry for the above reasons, the current from (c) to (d) passes through the parasitic diode 188 in the CPU 200. In this case, a stress equivalent to the forward voltage to the parasitic diode 188 will be applied to the terminal 214 in the CPU 200, but because the reverse voltage occurring at F1 (104) of the camera is low, and because the resistor 184 and the diode 182 are in series with the parasitic diode 188, the aforementioned stress is extremely small, and is of a level which presents no problems with respect to the CPU 200 hardware.

In the second stage of the flash mounting process, a normal circuit is formed because the flash device is completely mounted.

As hereinbefore described, in the preferred embodiments according to the present invention, improper circuit operation, accidental flash light emission, and circuit damage do not occur during the flash mounting process.

In the case in which the flash device is dismounted, equivalent phenomena occur because the process is the exact reverse of the mounting process, and further description is herein omitted.

The description given hereinabove has related specifically to a case in which the terminals F1 (104), DGND (107), F2 (105), F3 (106), and FVDD1 (103) are arrayed in a staggered pattern in the above order from rear to front of the camera. Specifically, the above array was obtained from the following points of view:

1. Accidental flash light emission firing is avoided when mounting the flash by an array in which the X-contact of the flash is connected last.

2. Improper operation of flash device logic circuits is avoided by an array in which the voltage output terminal of the camera is connected last.

3. Signal contacts which do not output a voltage from the camera may be arrayed in such a manner that said contacts may momentarily connect improperly during the mounting process.

A case in which the contact array differs from that described above and trouble occurs is described below.

Figure 12:
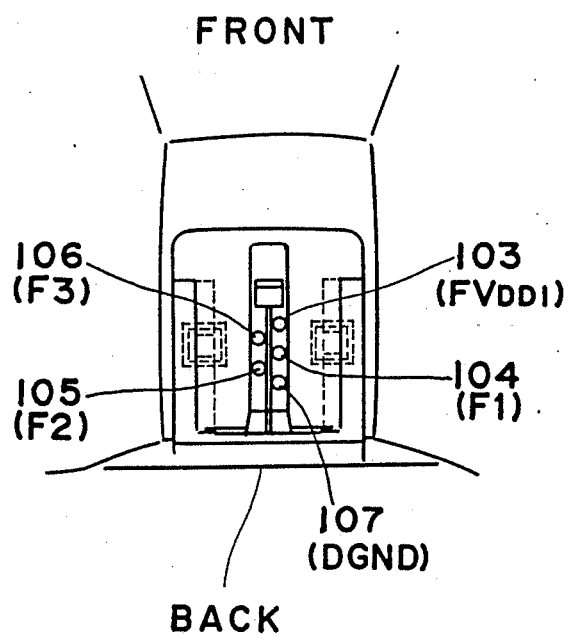
FIG. 12 and FIG. 14 show contact arrays used for a comparison of the contact arrays according to the present invention.
Figure 13:
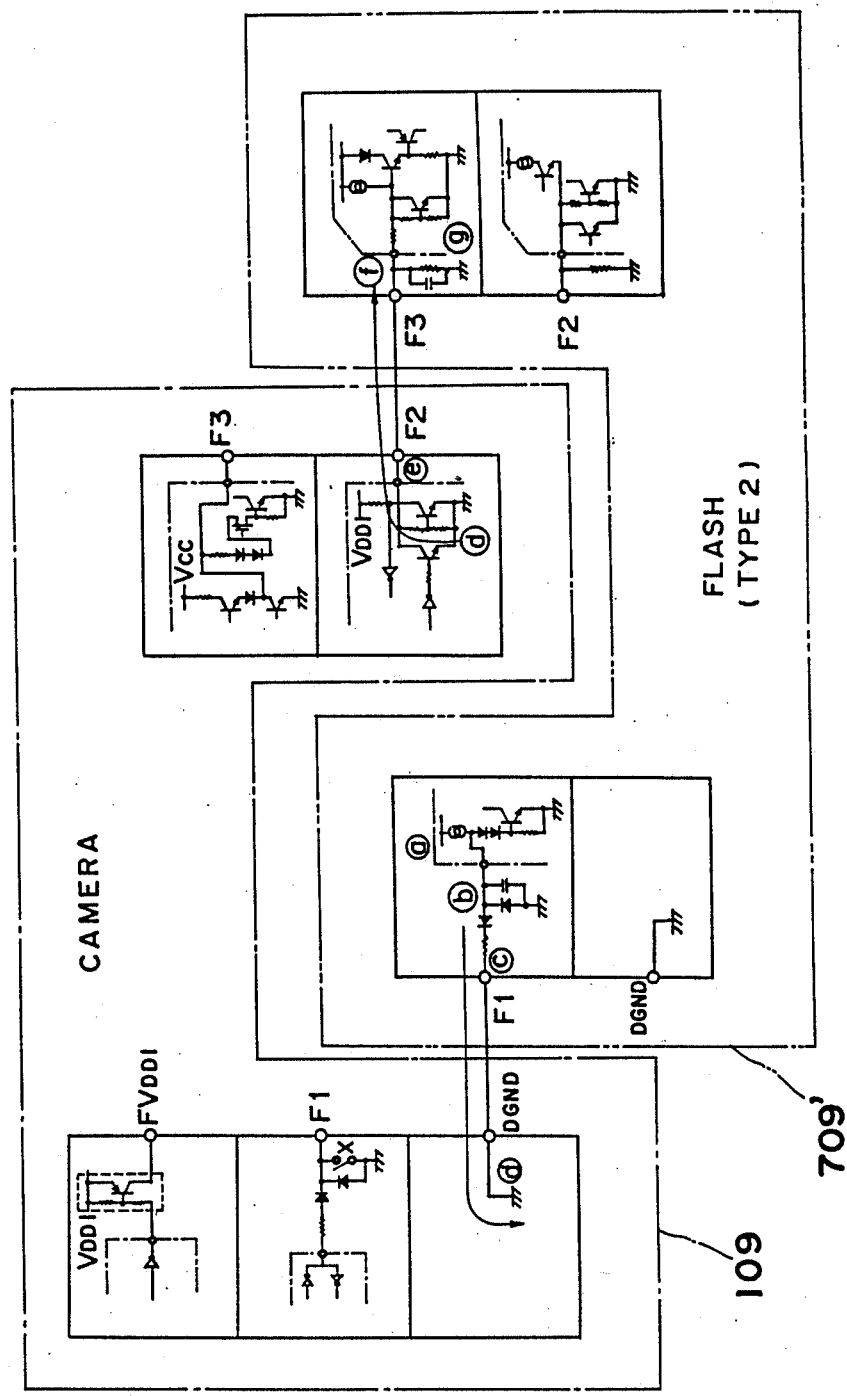

In this case, terminal (contacts) DGND (107), F2 (105), F1 (104), F3 (106), and FVDD1 (103) are arrayed in a staggered pattern in the above order from back to front of the camera as shown in FIG. 12. In this case, trouble occurs when the camera is combined with a flash of the second type. Specifically, at the first stage of the mounting process as shown in FIG. 13, the terminals F1 and F3 of the flash connect momentarily with the terminals DGND and F2 of the camera, respectively. Because the flash has a self-contained power supply, current flows from (a) to (b) to (c) to (d) to (e) to (f) to (g), and as a result, the terminal F1 of the flash (that is, the X contact) is connected through the camera circuitry to the GND contact of the flash with a certain impedance. Thus, if the flash device is mounted (or dismounted) with (or from) the circuitry including the main capacitor in the flash in a fully charged state, the flash device may accidentally emit flash light at some point in the mounting or dismounting process.

Moreover, because the current flows from (d) to (e), the potential at (e) in the camera circuitry becomes lower than the potential of (d), and if the camera circuitry consists of an IC, it is possible that the absolute maximum rating of the IC will be exceeded and the IC be destroyed.

For these reasons, the contact array as shown in FIG. 12 presents many problems and is therefore not desirable.

A case in which the contact array differs further from the above, specifically, in which the power supply contact (FVDD1) of the camera connects improperly when mounting the flash device, is described below.

Figure 14:
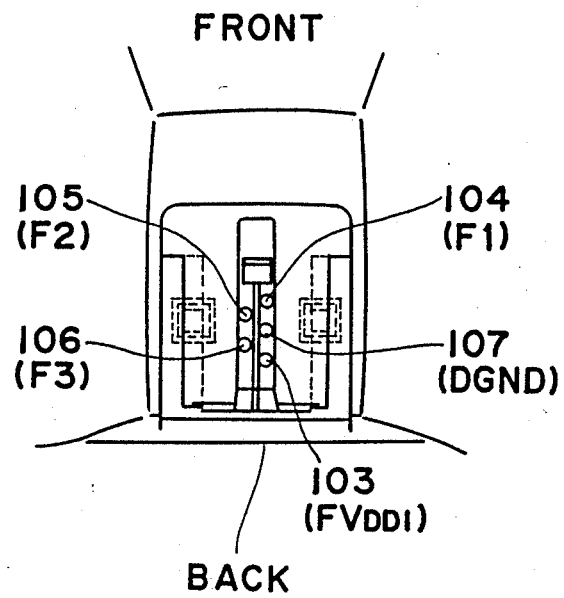
Figure 15:
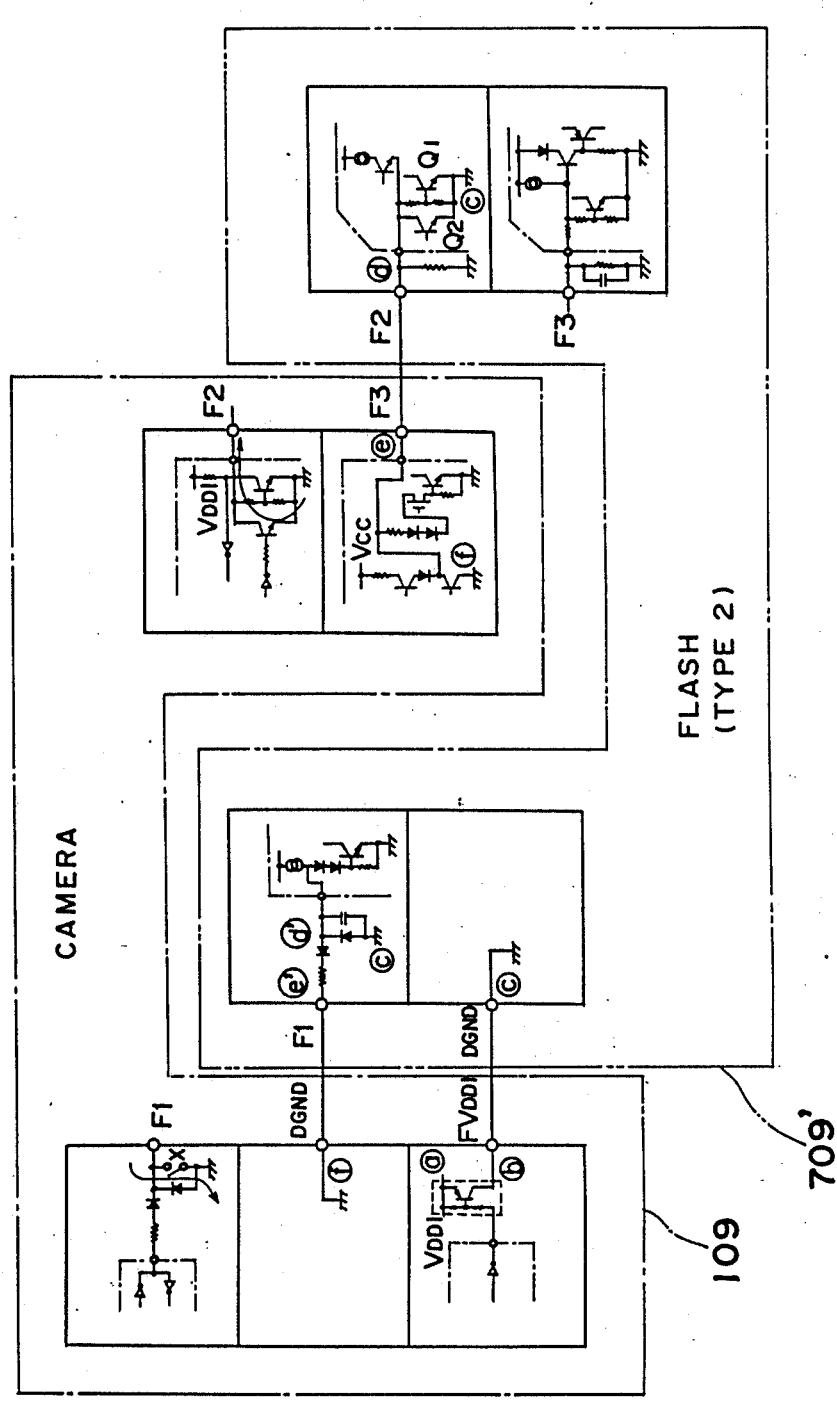

As shown in FIG. 14, terminals (contacts) FVDD1 (103), F3 (106), DGND (107), F2 (105), and F1 (104) are arrayed in a staggered pattern in the order from back to front of the camera. In this case also, trouble occurs when the camera is combined with a flash of the second type. Specifically, at the first stage of the flash mounting process as shown in FIG. 15, the terminals F1, DGND, and F2 of the flash connect momentarily with the terminals DGND, FVDD1, and F3 of the camera, respectively. At this time, current flows from (a) to (b) to (c) to (d) to (e) to (f). Therefore, a reverse bias is applied to the circuitry in the flash, for example to transistors Q1, Q2, and it is possible that the circuitry in the flash may be destroyed.

Current may also flow from (a) to (b) to (c) to (d') to (e') to (f), thus causing the F1 contact on the flash to be pulled to a negative potential from the flash side, and causing the flash to accidentally emit light. In this example, a reverse bias is applied to the flash circuitry because the power supply contact FVDD1 of the camera is positioned such that it improperly connects momentarily during the flash mounting process, and because the F1 contact on the flash is positioned such that it improperly connects momentarily during the flash mounting process, problems such as the flash accidentally emitting when being mounted occur.

The examples described with reference to FIGS. 12 to 15 are specific examples in which problems will occur, and if the basic principles of the contact array according to the present invention are deviated from with other contact arrays, improper operation and circuit damage may occur.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

what is claimed is:

1. An accessory shoe for mounting an electronic flash device on a camera, said accessory shoe being located on a top portion of the camera and including a plurality of terminals for circuitry of the camera arrayed along a direction in which the electronic flash device is inserted into said accessory shoe, said plurality of terminals including at least a ground terminal and a terminal leading to an X contact of the camera for outputting a signal indicative of a condition of the X contact, said X contact terminal being positioned closer to an insertion opening of the accessory shoe than any other terminal of said plurality of terminals, including said ground terminal, and said X contact terminal being connectable to a terminal on the flash device for inputting said signal when the flash device is mounted on the camera.

2. The accessory shoe as claimed in claim 1, wherein said plurality of terminals are arrayed along a direction parallel to an optical axis of the camera.

3. The accessory shoe as claimed in claim 1, wherein said plurality of terminals are arrayed in two series in a staggered pattern.

4. The accessory shoe as claimed in claim 1, wherein said plurality of terminals are arrayed in a single series.

5. The accessory shoe as claimed in claim 1, wherein a terminal which outputs a voltage from the camera is located at a position farthest from said insertion opening of said accessory shoe.

6. An electronic flash device which can be detachably mounted on a camera, comprising a plurality of terminals for circuitry of said flash device which are arrayed at a bottom thereof along a direction in which said electronic flash device is inserted into an accessory shoe of the camera, said plurality of terminals including at least a ground terminal and an input terminal which receives a signal indicative of a condition of an X contact from the camera, said input terminal being positioned further from a front side of said electronic flash device than any other terminal of said plurality of terminals, including said ground terminal, and said input terminal being connectable to an output terminal of the camera leading to said X contact to input said signal when said flash device is mounted to the camera, said input terminal being free of contact with any terminal on the accessory shoe other than said output terminal leading to said X contact during a mounting operation of said flash device.

7. The electronic flash device as claimed in claim 6, wherein said plurality of terminals are arrayed in a direction parallel to an optical axis of said electronic flash device.

8. The electronic flash device as claimed in claim 6, wherein said circuitry of said electronic flash device does not have its own power supply.

9. The electronic flash device as claimed in claim 6, wherein said circuitry of said electronic flash device includes a power supply.

10. The electronic flash device as claimed in claim 8, wherein a terminal which receives a voltage from the camera is located at a position closest to the front side of said electronic flash device.

11. An accessory shoe for mounting an electronic flash device on a camera, said accessory shoe being located on a top portion of the camera and including a plurality of terminals for circuitry of the camera arrayed along a direction in which the electronic flash device is inserted into said accessory shoe, said plurality of terminals including at least a terminal for transmitting data between the camera and the electronic flash device, and a terminal leading to an X contact of the camera for outputting a signal indicative of a condition of the X contact, said X contact terminal being positioned closer to an insertion opening of the accessory shoe than any other terminal of said plurality of terminals, including said data transmission terminal, and said X contact terminal being connectable to a terminal on the flash device for inputting said signal when the flash device is mounted on the camera.

12. The accessory shoe as claimed in claim 1, wherein said plurality of terminals are arrayed along a direction parallel to an optical axis of the camera.

13. The accessory shoe as claimed in claim 1, wherein said plurality of terminals are arrayed in two series in a staggered pattern.

14. The accessory shoe as claimed in claim 1, wherein said plurality of terminals are arrayed in a single series.

15. The accessory shoe as claimed in claim 1, wherein a terminal which outputs a voltage from the camera is located at a position farthest from said insertion opening of said accessory shoe.

16. An electronic flash device which can be detachably mounted on a camera, comprising a plurality of terminals for circuitry of said flash device which are arrayed at a bottom thereof along a direction in which said electronic flash device is inserted into an accessory shoe of the camera, said plurality of terminals including at least a terminal for transmitting data between the camera and the electronic flash device and an input terminal which receives a signal indicative of a condition of an X contact from the camera, said input terminal being positioned further from a front side of said electronic flash device than any other terminal of said plurality of terminals, including said data transmission terminal, and said input terminal being connectable to an output terminal of the camera leading to said X contact to input said signal when said flash device is mounted to the camera, said input terminal being free of contact with any terminal on the accessory shoe other than said output terminal leading to said X contact during a mounting operation of said flash device.

17. The electronic flash device as claimed in claim 6, wherein said plurality of terminals are arrayed in a direction parallel to an optical axis of said electronic flash device.

18. The electronic flash device as claimed in claim 6, wherein said circuitry of said electronic flash device does not have its own power supply.

19. The electronic flash device as claimed in claim 6, wherein said circuitry of said electronic flash device includes a power supply.

20. The electronic flash device as claimed in claim 8, wherein a terminal which receives a voltage from the camera is located at a position closest to the front side of said electronic flash device.

* * * * *